Nov. 27, 1928.  1,692,824
W. H. FURNESS
FILTER OR STRAINER AND METHOD OF MAKING THE SAME
Filed Sept. 1, 1925
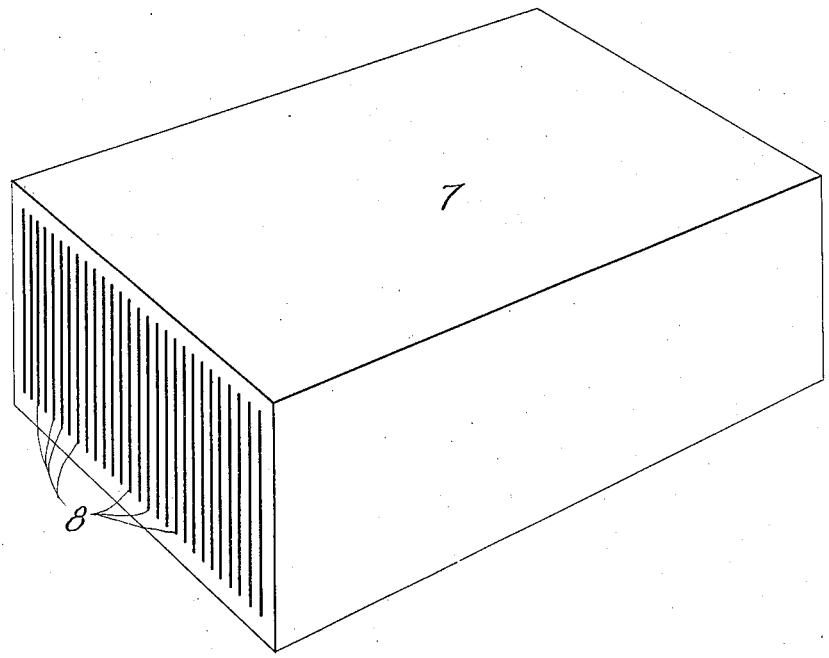
INVENTOR
William H. Furness
BY
Synnestvedt & Lechner
ATTORNEYS Patented Nov. 27, 1928.

1,692,824

UNITED STATES PATENT OFFICE.

WILLIAM H. FURNESS, OF NATIONAL PARK, NEW JERSEY, ASSIGNOR TO CELLOCILK COMPANY, OF PHILADELPHIA, PENNSYLVANIA, A CORPORATION OF DELAWARE.

FILTER OR STRAINER AND METHOD OF MAKING THE SAME.

Application filed September 1, 1925. Serial No. 53,800

This invention relates to filters or strainers and the method of making same.

The invention is particularly useful in the art of manufacturing silk, wherein the solution must be strained or filtered and in which the present straining means, particularly in the manufacture of some kinds of silk, is ineffective.

I propose to employ something similar to metallic wool. However, the metallic wool on the market I have found is unsatisfactory for this purpose, as is vegetable wool, the former because it will not strain properly and the latter primarily because it will not stand up in service.

In carrying out my invention, in its preferred form, I propose to shave very thin sheets or leaves of metal, such, for example, as sheets of tin foil, the shavings being also very thin so that they are approximately square.

In order to make it possible to shave a leaf and also in order to cheapen the process, I embed a plurality of sheets in a body of paraffine or other suitable substance or, to state it in another way, I provide a block of such substance within which the sheets are embedded. One way of making such a block is to lay the sheets successively, one on top of another, into a bath of hot paraffine or the like. The sheets will pack relatively closely but there will remain an intervening film or thickness of the substance between the sheets, so that the sheets will be supported.

I then take the block and lay it on a horizontal plane with the sheets of tin foil in planes vertical to the surface of the plane, moving it back and forward. The weight of the block is sufficient to cause the cutting blade of the plane to shave off shavings of the desired thickness.

When a sufficient amount of shavings has been formed, I throw them into a bath of hot water, or other suitable medium, with which to remove the wax or other substance. The metallic shavings are then balled up to constitute a filter or strainer.

I have found that a strainer made in this fashion is highly effective for straining solutions such as are used in the manufacture of artificial silk. I attribute this to the fineness of the shavings and to the fact that they show, under the microscope, saw-tooth edges. By virtue of these physical characteristics the shavings when formed into a ball or pad or block have exceedingly fine interstices therebetween. Apparently the saw-like edges break up clots and undissolved particles; or strain them out. Whatever the reason may be I have found a filter so made superior and effective where other forms of filters or strainers are ineffective.

In the drawing I have shown a block 7 composed of paraffine or other substance with the metallic sheets 8 embedded therein, as above described.

When the block is shaved, the shavings crinkle to some extent but the metal sheets are adequately supported to permit of the shaving operation. The initial crinkling or twisting in all probability also plays a part in the effectiveness of the strainer.

The shavings may be formed into pads or cartridges of different density to suit the fluid to be strained.

I claim:—

The herein described process of making a filter or strainer which consists in embedding a plurality of thin metallic sheets in a wax-like block, in shaving said block, in removing the wax-like substance from the metallic shavings produced and in balling the clean shavings.

In testimony whereof, I have hereunto signed my name.

WILLIAM H. FURNESS.